United States Patent [19]
Dimmick et al.

[11] Patent Number: 5,558,233
[45] Date of Patent: Sep. 24, 1996

[54] CONTAINER INSPECTION APPARATUS FOR DETERMINING THE WALL THICKNESS OF NON-ROUND CONTAINERS AND ASSOCIATED METHOD

[75] Inventors: Henry M. Dimmick, Butler; Jerrold K. Shetter, Cabot; Joseph L. Kisiel, Butler, all of Pa.

[73] Assignee: AGR International, Inc., Butler, Pa.

[21] Appl. No.: 330,311

[22] Filed: Oct. 27, 1994

[51] Int. Cl.⁶ ........................................................ B07C 5/00
[52] U.S. Cl. ............................ 209/522; 209/523; 209/530
[58] Field of Search ..................................... 209/522, 523, 209/530; 324/671, 662, 686, 687, 688, 690

[56] References Cited

U.S. PATENT DOCUMENTS

| | | | |
|---|---|---|---|
| 2,573,824 | 11/1951 | Baker | 209/81 |
| 2,616,068 | 10/1952 | McDonald | 209/523 X |
| 4,820,972 | 4/1989 | Scott et al. | 324/61 P |
| 4,862,062 | 8/1989 | Baker et al. | 324/61 R |
| 4,870,342 | 9/1989 | Scott | 324/61 R |
| 4,930,364 | 6/1990 | Baker et al. | 73/865.9 |
| 4,965,523 | 10/1990 | Baker et al. | 209/523 X |
| 4,972,566 | 11/1990 | Andersen et al. | 29/402.08 |
| 5,097,216 | 3/1992 | Dimmick, Sr. et al. | 324/671 |

*Primary Examiner*—David H. Bollinger
*Attorney, Agent, or Firm*—Arnold B. Silverman; Eckert Seamans Cherin & Mellott

[57] ABSTRACT

Apparatus for inspecting the wall thickness of non-round containers includes capacitive sensors which cooperate with oscillator means to provide voltage signals corresponding to container wall thickness to electronic processors which convert the voltage signals to corresponding thickness values and compare them with the desired thickness values. The apparatus subjects the containers to translational movement through the inspection zone while resisting rotational movement. The sensors have at least one sensor element having capacitive sensor portions that are not in the same plane as other capacitive sensor elements or a single sensor element having portions in more than one plane. The sensor elements may be individual sensor elements which are each adapted to inspect different portions of a container or may, in another embodiment, be a single sensor element. The sensors are adapted to be movably mounted so as to maintain efficient contact with non-round containers during inspection. Among the types of containers which may be inspected by the apparatus are generally rectangular and generally oval containers. A corresponding method is provided.

45 Claims, 10 Drawing Sheets

CONTAINER INSPECTION APPARATUS FOR DETERMINING THE WALL THICKNESS OF NON-ROUND CONTAINERS AND ASSOCIATED METHOD

BACKGROUND OF THE INVENTION

1. Field of the Invention

The present invention relates to apparatus for measuring the wall thickness of non-round containers and, more specifically, it includes apparatus and methods for measuring wall thickness of translating containers of various non-round configurations.

2. Description of the Prior Art

It has long been known, with respect to containers, such as glass and plastic bottles and jars, to inspect the same for compliance with various specifications, such as shape, dimensions, wall thickness, and any other departures from the specified parameters. In connection with such inspection, it has been known to use a sampling technique wherein periodically a sample container is removed from the production line and inspected. For glass containers, the measurement of thickness, for example, has been accomplished by hand-held capacitive or ultrasonic thickness measuring instruments. In the alternate, destructive testing as by taking a sample and cutting it into pieces with subsequent mechanical measurement has also been known. While such sampling techniques can provide accurate measurements, they suffer from the disadvantage of using samples and the need to make statistical inferences based upon the results of such sampling. As every container is not inspected, it is possible that a number of defects will go unnoticed. This can result not only in loss of the container, but loss of the product to be placed in the container and, perhaps, injury to the consumer or other end user.

It has been known to employ capacitive means for automatically inspecting wall thickness of containers made of dielectric materials with inspection of each container as distinguished from sampling techniques being employed. See, generally, U.S. Pat. Nos. 2,573,824; 4,820,972; 4,862,062; 4,870,342; 4,930,364; 4,965,523; and 4,972,566. It has also been known, in such a context, to provide a plurality of sensors which cooperate with oscillator means to produce an output voltage responsive to capacitance changes which voltage is employed to determine desired parameters. See, for example, U.S. Pat. Nos. 4,862,062; 4,870,342; 4,965,523; and 4,972,566. It has also been known to provide such a system wherein a plurality of containers rotating by and being urged into intimate contact with capacitive sensors may be inspected simultaneously. See U.S. Pat. No. 5,097,216 which is owned by the assignee of the present application.

These prior systems were directed toward inspecting round dielectric containers. When non-round containers, such as oval containers, for example, are to be inspected, these systems are not readily applicable.

There remains, therefore, a real and substantial need for an automated means of rapidly inspecting containers composed of a dielectric material which have a non-round configuration, such as a rectangular or generally oval configuration, for example.

SUMMARY OF THE INVENTION

The present invention has met the above-described need by providing apparatus and an associated method wherein capacitive sensors provide thickness information to oscillator means which are operatively associated therewith and generate corresponding voltage signals which are received by electronic processor means which determine wall thickness and effect comparison with desired thickness values. The sensors preferably have capacitive sensing element portions which are not in the same plane as other capacitive sensing elements or portions on the same sensor. It is preferred to provide sensor means on both sides of the path of travel over the container and to effect translational movement of the container through the inspection zone while resisting axial rotation of the container.

The sensor means may include, as to each side of the path of container travel, a plurality of generally vertically spaced sensors. Each sensor, in one embodiment, has a first surface and a second surface disposed at an angle thereto and abutting the first surface with discrete sensor elements disposed on the first surface, on the second surface and in the region of abutment of the first and second surfaces.

It is preferred that the containers be subjected to translational movement between a first set of sensors on one side of the path of travel of the containers and a second set of sensors on the other side of the path of travel. The sensors may be movable so as to inspect different portions of the container.

It is an object of the present invention to provide inspection apparatus and an associated method for effecting wall thickness inspection of non-round containers.

It is a further object of the invention to provide such a system wherein capacitive sensor means are movably mounted so as to facilitate accurate and rapid inspection of the wall thickness of moving non-round containers.

It is a further object of the present invention to provide such a system wherein mass of the sensor means is kept at a low level so as to facilitate maintaining intimacy of contact between the sensor means and the containers.

It is another object of the present invention to provide such a system wherein axial rotation of the containers during inspection is resisted.

It is a further object of the invention to provide such a system wherein individual sensors have sensor portions or elements which are not planar with respect to other sensor elements or portions thereof.

These and other objects of the invention will be more fully understood from the following description of the invention on reference to the illustrations appended hereto.

DESCRIPTION OF THE PREFERRED EMBODIMENT

As used herein, the expression "non-round container" will refer to containers of shapes which are not symmetrical with respect to the longitudinal axis of the container and shah expressly include, but not be limited to rectangular and oval shaped containers.

Figure 1:
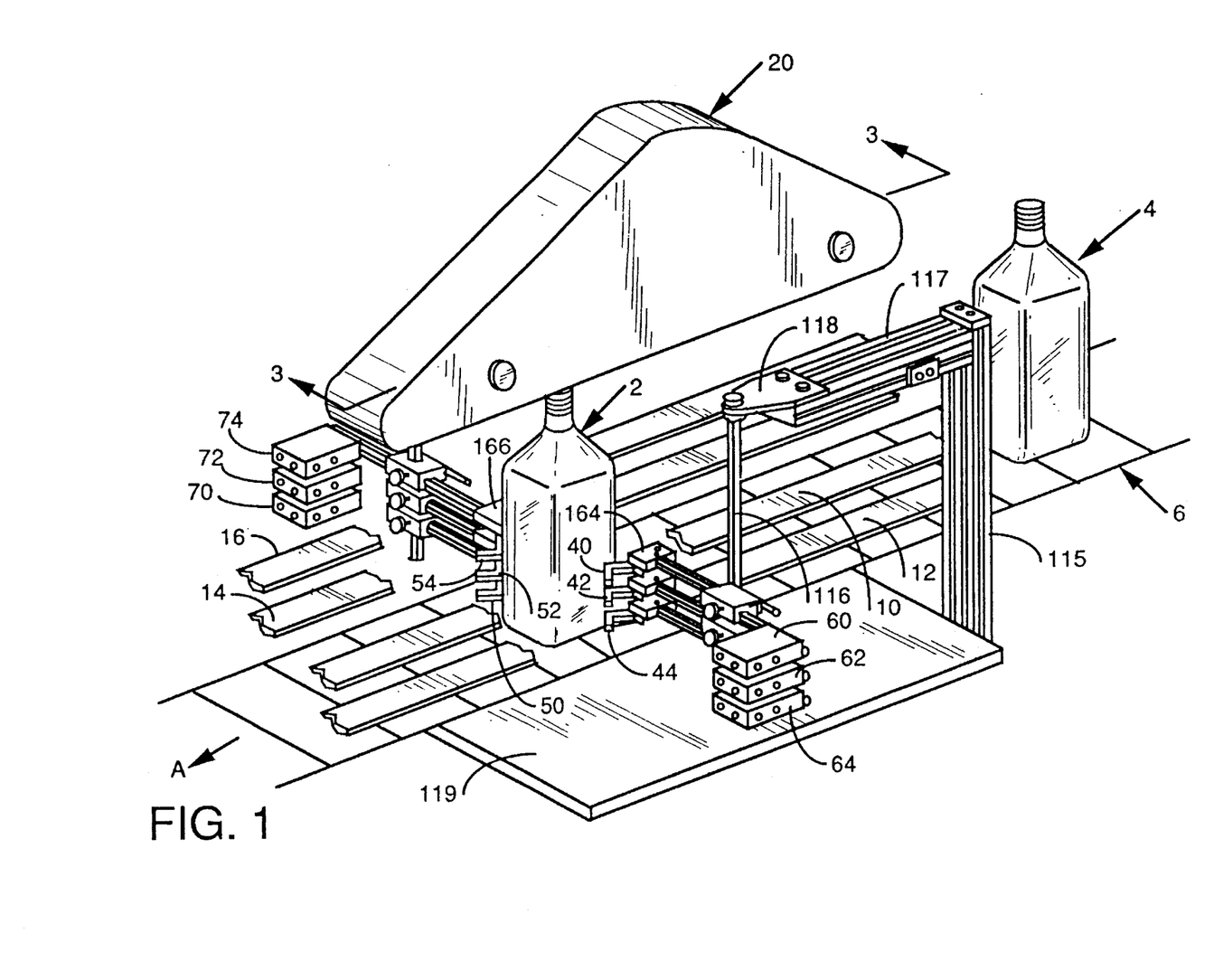
FIG. 1 is a perspective view of a form of inspection apparatus of the present invention.

Referring to FIG. 1, there is shown a pair of containers 2, 4 moving in the direction indicated by arrow A under the influence of conveyor 6. The containers which, in the form shown, are generally rectangular with curved corners, are moved in a translational manner through the inspection zone and are guided by a pair of first generally vertically spaced rails 10, 12 on one side of the path of travel of the containers 2, 4 and a corresponding pair of generally vertically spaced rails 14, 16 on the other side of the path of travel of containers 4, 2 with the spacings between rails 10 and 12, on the one hand, and rails 14 and 16 on the other, being such as to resist axial rotation of the containers 2, 4.

Figure 3:
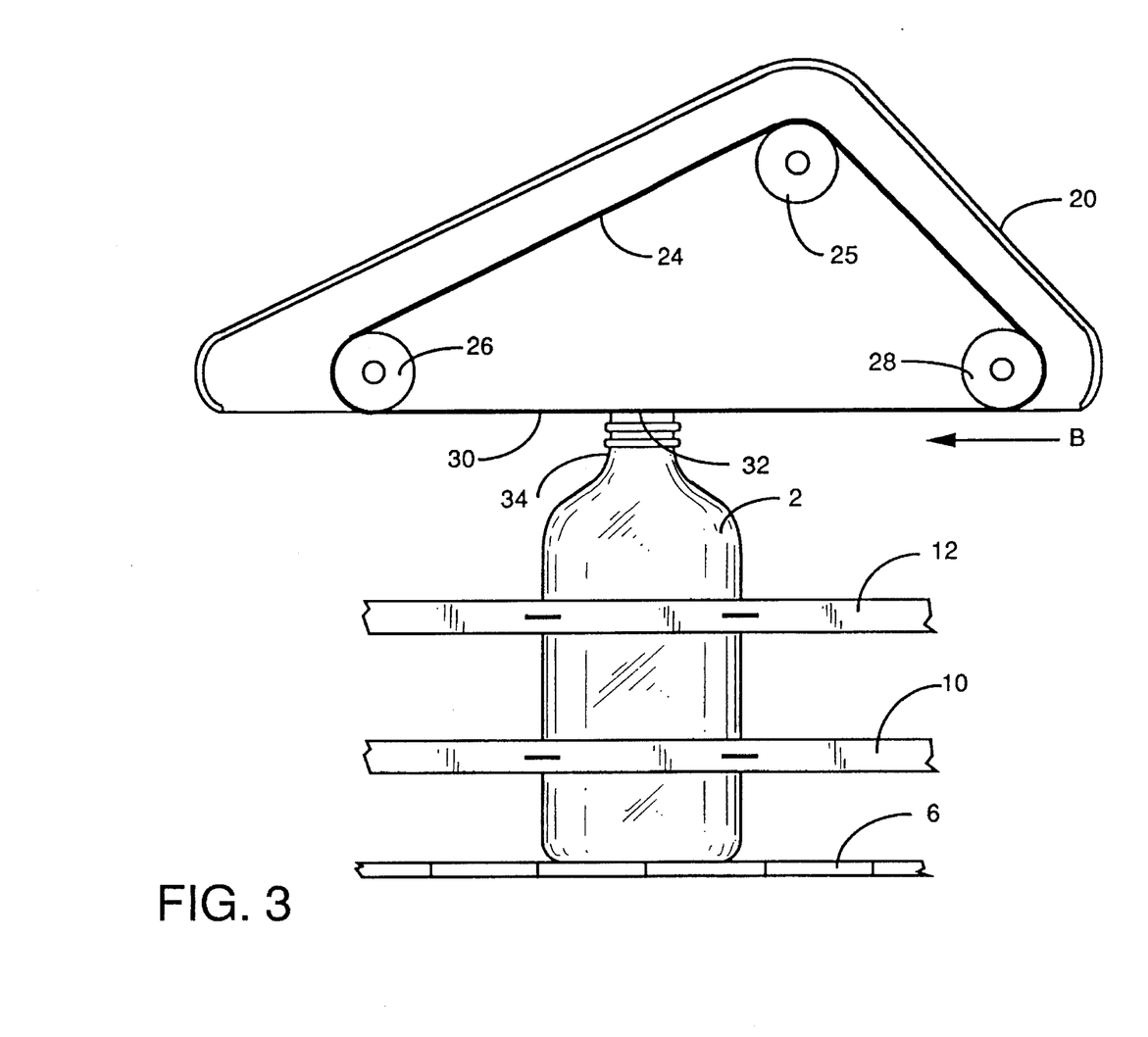
FIG. 3 is a cross-sectional illustration through 3—3 of FIG. 1 showing a portion of the container retention and drive means.

Referring to FIGS. 1 and 3, there is shown a housing 20 within which is an orbiting endless hold-down belt 24 which is engaged with pulleys 25, 26, 28 and has its undersurface 30 in intimate contact with the upper portion 32 of container neck 34. The belt 24 serves to resist undesired vertical movement of the container which could interfere with the accuracy of the thickness readings in respect of knowing precisely what vertical portion of the container 2 is being inspected. In the form shown in FIG. 3, pulley 28 is driven by a suitable motor (not shown) to orbit the belt in the direction indicated by arrow B. Pulley 26 is an idler pulley and pulley 25 is a tensioner pulley which permits adjustment of the tension in endless belt 24. It will be appreciated that with the container 2 firmly supported on conveyor means 6 experiencing a downward stabilizing force from endless belt 24 orbiting in the direction of container travel (arrow B) and being restrained between guide rails 10, 12 and guide rails 14, 16 effective control of the container 2 is achieved.

Figure 2:
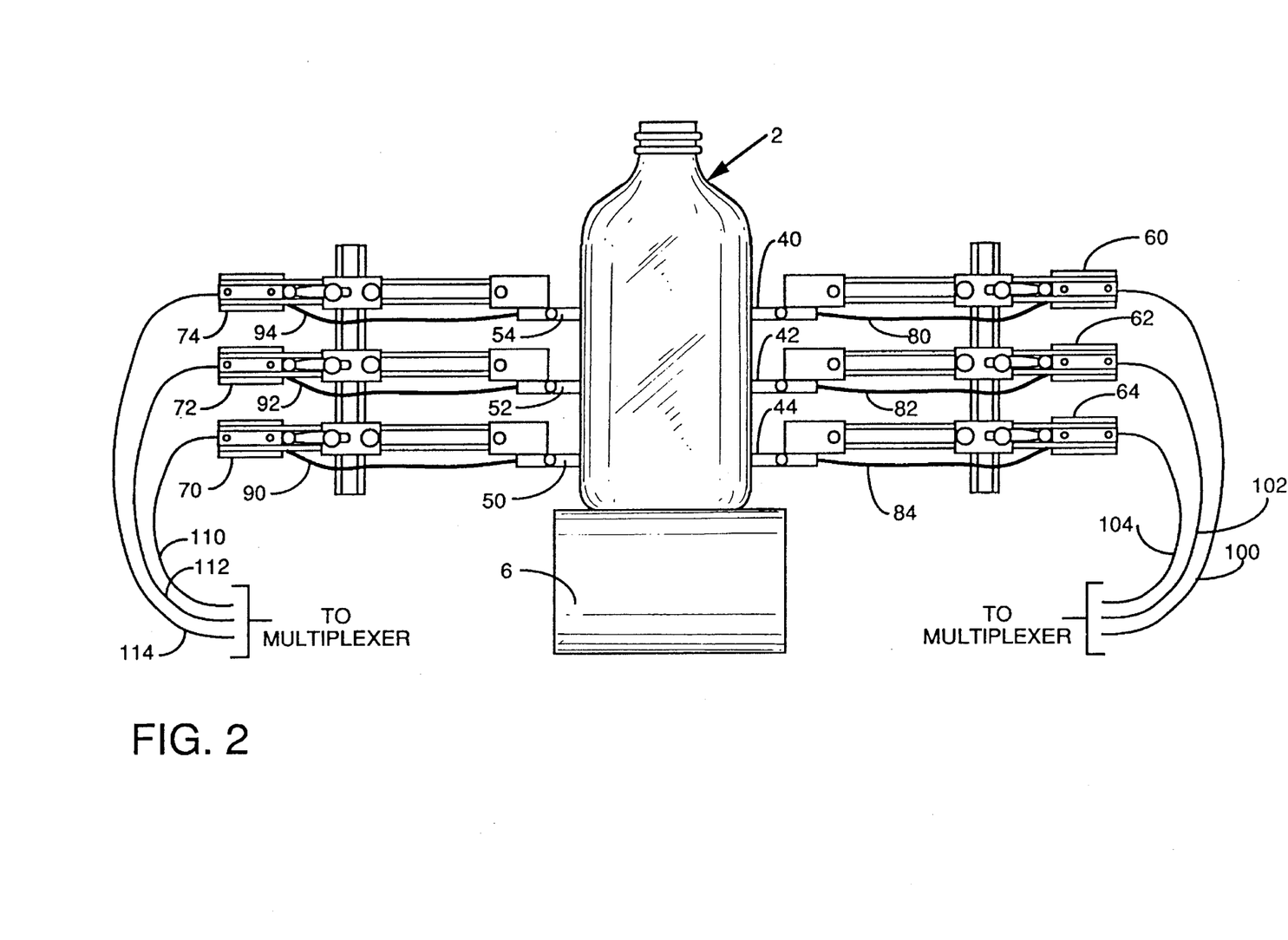
FIG. 2 is a partially schematic elevational view showing a portion of the inspection system of the present invention and an associated container which is being inspected.

Referring to FIGS. 1 and 2, sensor means 40, 42, 44 are relatively vertically spaced from each other and are positioned on one side of the path of travel of the containers 2, 4. A second group of sensor means 50, 52, 54 are relatively vertically spaced from each other and are positioned on the opposite side of the path of travel of container 2. The sensors 40, 42, 44 and 50, 52, 54 are operatively associated with oscillator means 60, 62, 64, 70, 72, 74, respectively. The changes in capacitive sensors 40, 42, 44 and 50, 52, 54 are reflective of changes in wall thickness of container 2 and in the portion being inspected will be converted by the cooperating oscillators 60, 62, 64, 70, 72, 74, respectively, which receive the capacitive change signals through cables 80, 82, 84, 90, 92, 94, respectively, and convert the capacitive changes into corresponding voltage output signals which are delivered to associated multiplexers (not shown) through electrical leads 100, 102, 104, 110, 112, 114, respectively. The voltage signals are selectively passed through the multiplexer and through an analog-to-digital converter and into the electronic processor means for determination of a thickness value and comparison of the same with the desired thickness value in order to determine if a meaningful departure from the desired thickness has occurred.

As shown in FIG. 1, support column 115 is connected to horizontal support 117 to which rotatable shaft 116 is rotatably secured. The lower end of shaft 116 is fixedly secured to the sensor means assembly. Rotation of shaft 116, as by a pneumatic cylinder (not shown), for example, underlying cover plate 119 will cause the sensor means assembly to be rotated away from the conveyor 6 to facilitate machine setup, calibration or repair. A similar sensor means assembly support system would preferably be provided for the other assembly on the other side of conveyor 6.

Figure 4:
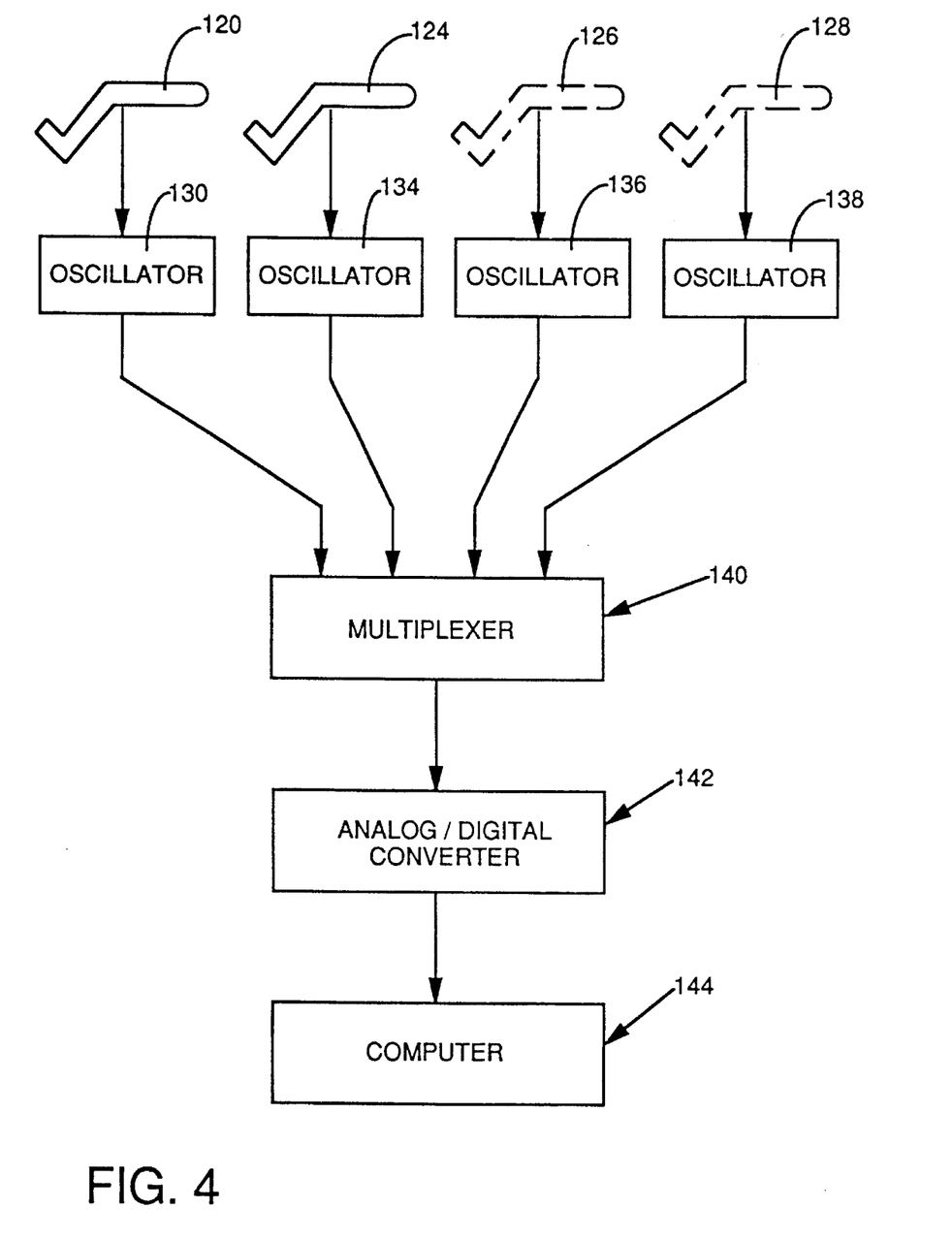
FIG. 4 is a schematic illustration showing a signal processing means of the present invention.

Referring to FIG. 4, there is shown schematically a group of four sensors 120, 124, 126, 128 which may be positioned on one side of the path of travel of the container in relatively vertically spaced relationship. Each cooperates with an associated oscillator 130, 134, 136, 138 with the output voltages of the oscillator being delivered to multiplexer 140 from which, on a selected basis, the voltages are introduced into analog-to-digital converter 142 which converts the voltages into digital pulses corresponding to the voltages which are emitted and delivered to electronic processor means 144 which, in the form shown, is a computer. The computer has entered therein a calibration factor indicating what material the container is made out of, such as, for example, glass or plastic and also the desired thickness or range of thicknesses of the container at the various elevations where it will be inspected. This permits the digital pulses received from analog-to-digital converter 142 to be compared in the computer with the desired thickness reading to determine whether the thickness is within a tolerable range or if, in the alternative, the actual thickness has departed from the desired thickness by a sufficient amount as to make it desirable to reject the container. If so, the computer may emit a signal to a reject mechanism which will deliver the rejected container to an appropriate conveyor or bin so that it will not be mixed with acceptable containers. As such reject mechanisms and means for triggering the same by means of a microprocessor are well known to those skilled in the art, details regarding the same need not be provided herein. If desired, the results of the inspection could be stored, provided in hard copy, and displayed on a monitor.

Figure 5:
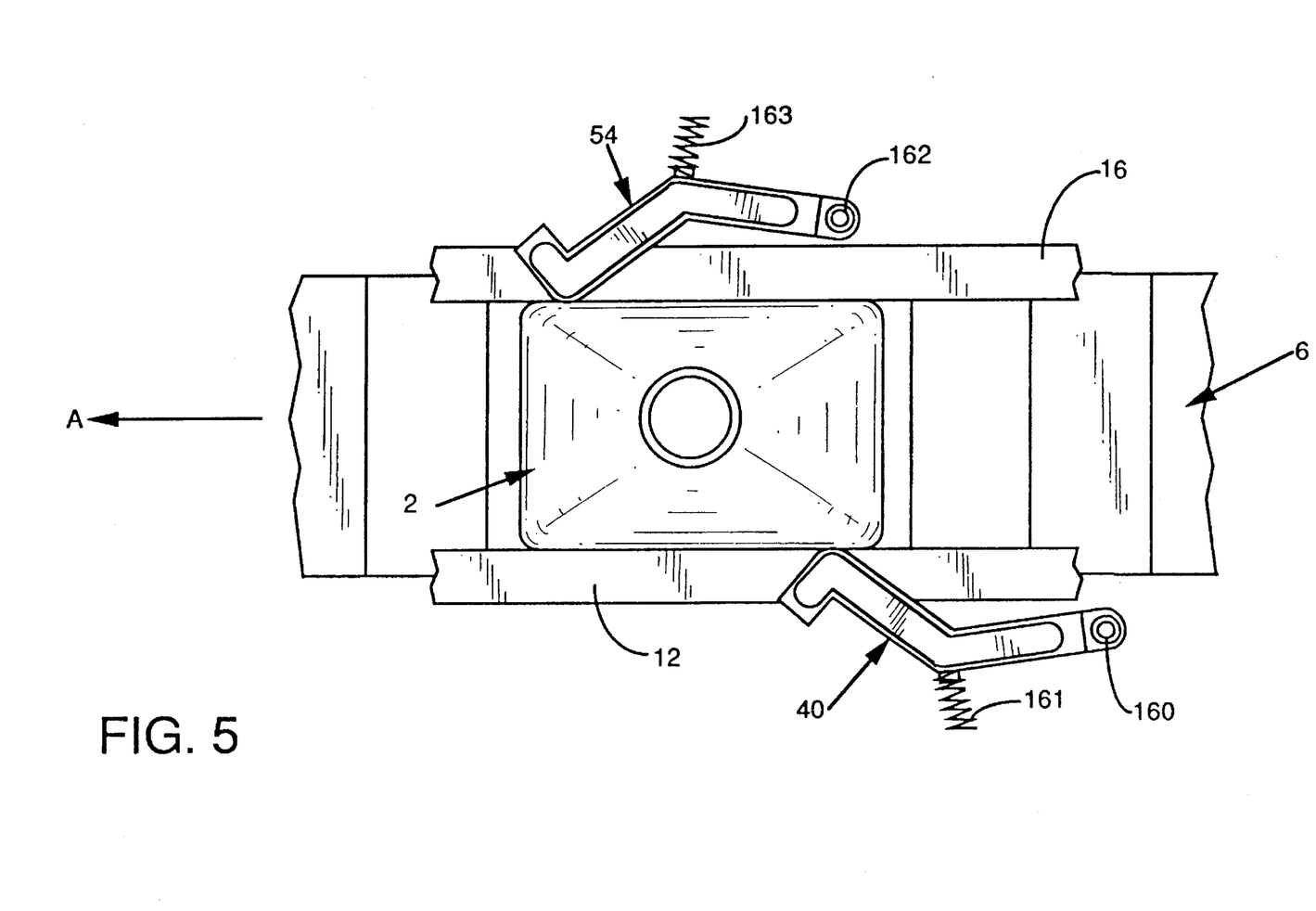
FIG. 5 is a partially schematic top plan view of a form of inspection system of the present invention adapted to inspect rectangular containers.
Figure 6:
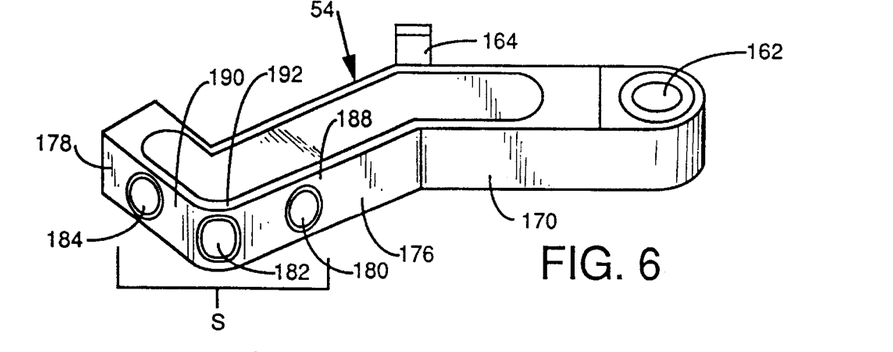
FIG. 6 is a perspective view of a form of sensor of the present invention suitable for inspecting rectangular containers.

Referring to FIG. 5, there is shown a portion of the embodiment of FIGS. 1–3, a rectangular container 2 is transported by conveyor 6 in the direction indicated by arrow A. Guide rails 12, 16 serve to resist rotation of the container 2 as it is translated by conveyor means 6 through the inspection region. Sensors 40, 54 are mounted for rotational movement about pivots 160, 162, respectively, which are disposed within housings 164, 166 (FIG. 1). Pivots 160, 162 are preferably offset with respect to each other about 2.5 to 3.5 inches measured along the path of travel of the container 2. As a result, one leading corner will be inspected before the others. In the position shown, sensor 40 will be biased by spring means contained within housing 164 to urge it into a clockwise direction which urges it into intimate contact with container 2. Sensor 54 will be resiliently urged in a counter-clockwise direction so as to establish intimacy of contact with container 2. Any suitable means, such as coil springs 161, 163 disposed within housings 164, 166 may be employed to accomplish this resiliently maintained contact.

Figure 7:
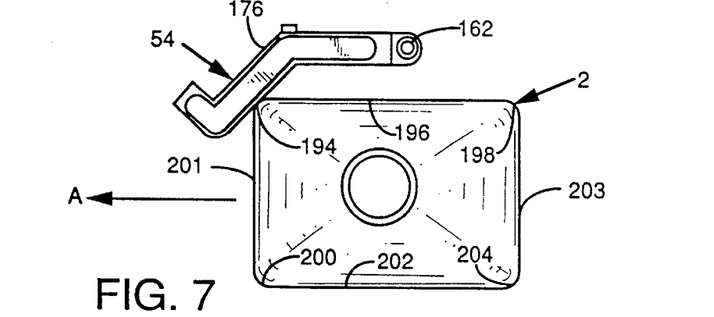
FIGS. 7 through 9 are schematic plan views showing the sensor of FIG. 6 in three different positions in inspecting a rectangular container.
Figure 8:
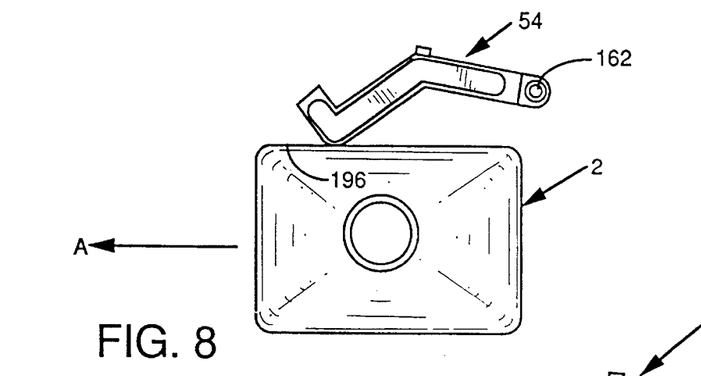
Figure 9:
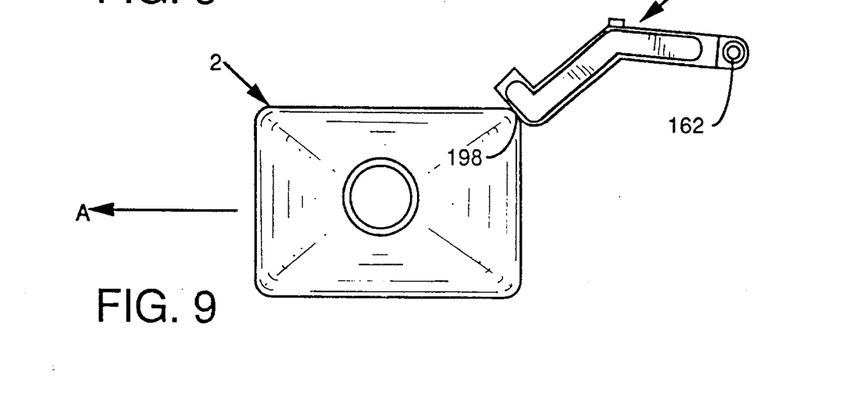

Referring to FIGS. 6 through 9, a sensor in the position of sensor 54 or a vertically spaced sensor pivoting about the same axis will be considered. It will be appreciated from what follows, with respect to sensor 40 (FIG. 5), the mirror image would be employed. The sensor 54 of FIG. 6 has a pivot receiving opening 162, a spring receiving projection 164, a first arm 170, a second arm 176, and a flange portion 178. The area employed in sensing the glass thickness has been designated "S" and includes three discrete sensor elements 180, 182, 184. It will be noted that sensor element 180 is positioned on a first surface 188, sensor 184 is positioned on a second surface 190, which is angularly disposed with respect to first surface 188, and sensor element 182 is positioned in the region where surfaces 188, 190 abut each other. By using three discrete sensor elements 180, 182, 184 within this region, inspection of a non-round container, such as rectangular container 2 which, in the form shown, has radiused corners may be accomplished. The manner in which this is accomplished is shown in FIGS. 7 through 9.

It will be appreciated that the system illustrated in FIGS. 6 through 9 inspects the leading and trailing corners 194, 200, 198, 204, and sidewalls 196, 202. If it were desired to inspect the leading and trailing walls 201, 203, a second pair of sensors similar to 40, 54 could be placed downstream with appropriate spacing between the sensors of the second pair and means for rotating the containers axially, could be placed upstream therefrom.

As shown in FIG. 7, the arm 176 extends across the leading upper corner 194 of container 2 with sensing element 180 in contact with corner 194 to inspect the wall thickness of the corner. As the container continues to move in the direction indicated by arrow A, as shown in FIG. 8, sensor element 182 contacts side wall 196 of container 2 and progressively measures the wall thickness of the side wall 196 throughout its extent as the container moves thereby. With reference to FIG. 9, the sensor element 184 is in contact with the trailing upper corner 198 of container 2 and inspects the wall thickness at that point. The mirror image sensor, such as sensor 40 (FIG. 1), would similarly inspect the leading corner 200, side wall 202, and trailing corner 204 (FIG. 7) of the container, simultaneously, with the inspection performed by sensor 54. In assuming the three positions shown in FIGS. 7 through 9, sensor 54 rotates about axis 162 under the influence of spring 163 (FIG. 5).

It will be appreciated that in this automated manner, the translated non-round container is subjected to inspection at a single elevation by the pair of sensors 40, 54. The container 2, in the embodiment shown in FIGS. 1 and 3, will also be inspected by other vertically spaced sensors positioned in the same location, such as 40, which is spaced from sensors 42 and 44, and sensor 54, which is vertically spaced from sensors 52 and 50. This will provide thickness readings of all corners and both sides at three distinct elevations.

Figure 10:
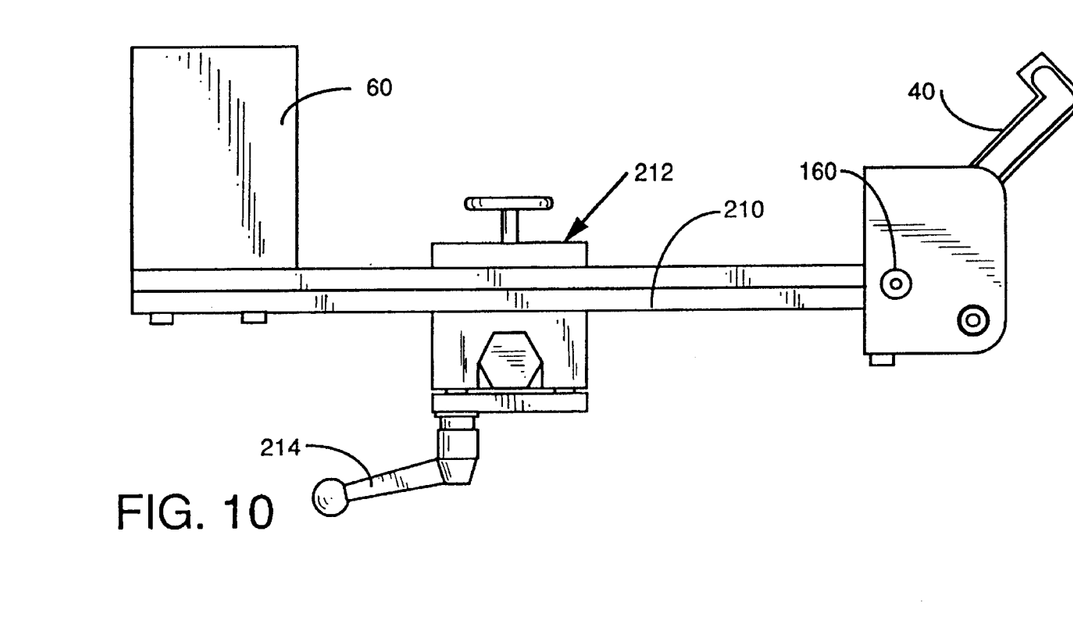
FIG. 10 is a top plan view of a portion of sensor means and associated apparatus employed to inspect rectangular containers.
Figure 11:
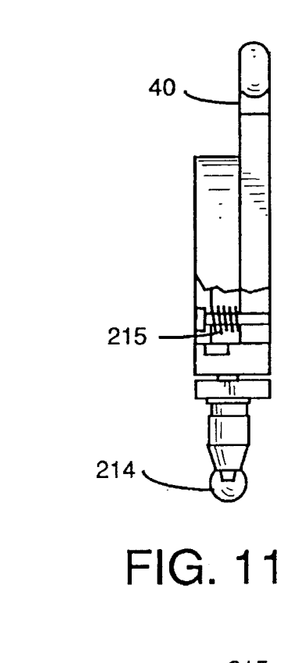
FIG. 11 is a right elevational view of the apparatus of FIG. 10.
Figure 12:
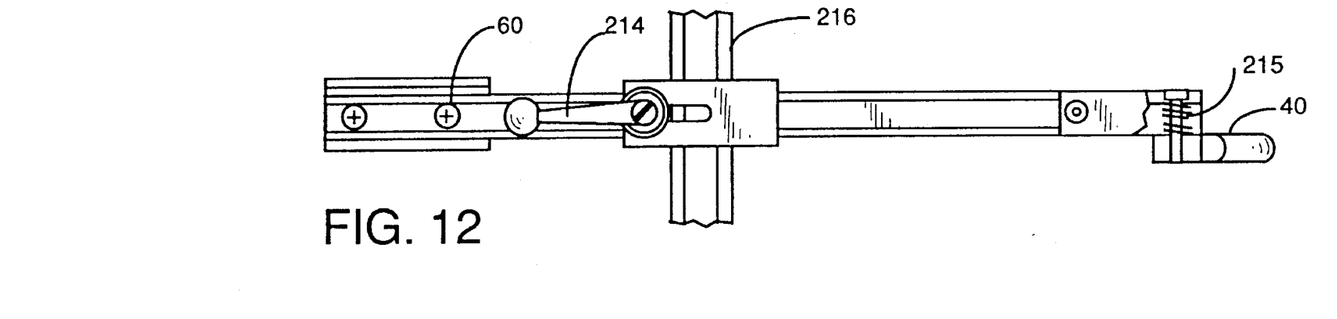
FIG. 12 is a front elevational view of the apparatus of FIG. 10.

FIGS. 10 through 12 show the associated support and operating mechanism for the sensors, such as sensor 40. The sensor 40 pivots about 160 and is supported by arm 210 which has an adjustment mechanism 212, may move the sensor 40 along track 216 in a path generally perpendicular to the conveyor 6 in order to move the inspection station to the desired position. Locking handle 214 is then rotated to secure mechanism 212 in the desired position. This construction, therefore, moves the sensor means toward and away from the conveyor. As shown in FIG. 12, torsion spring 215 urges the sensor into intimate contact with the container. Oscillator 60 is secured to the end of arm 210.

Figure 13:
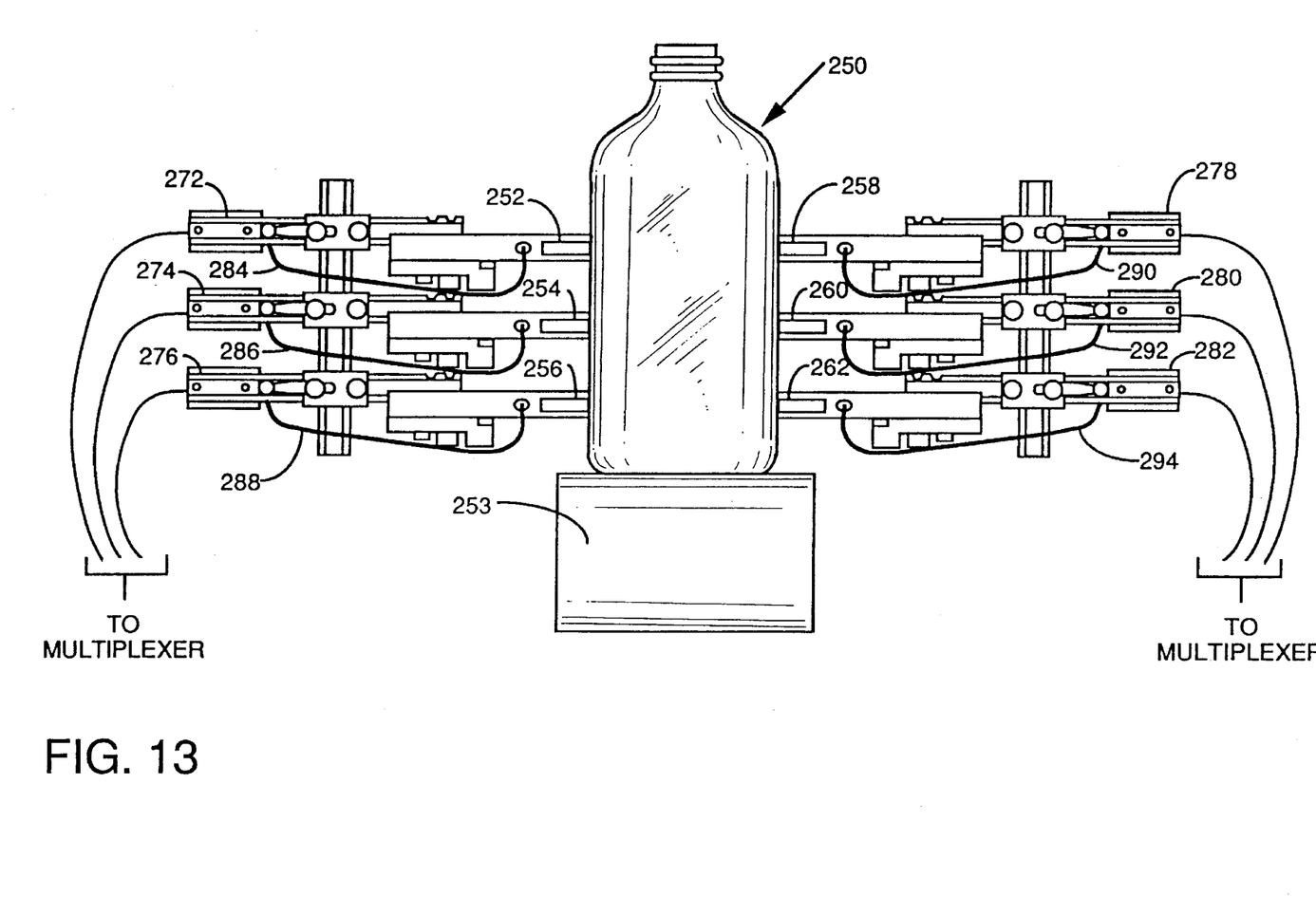
FIG. 13 is an elevational view showing a modified form of sensor and the associated inspection apparatus of the present invention.
Figure 14:
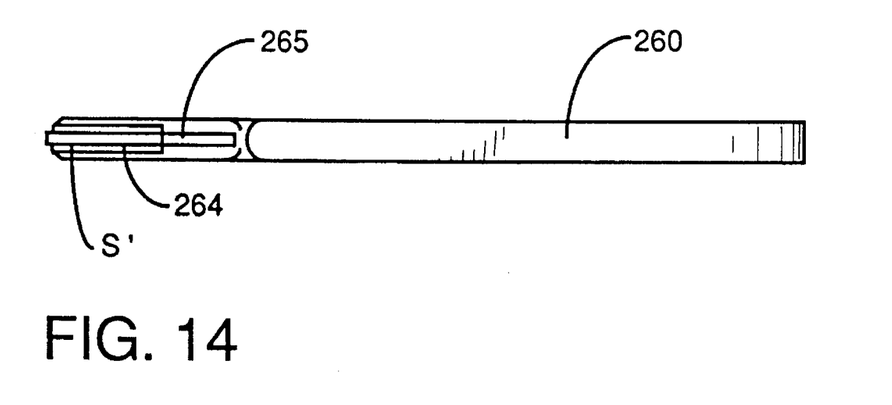
FIGS. 14 and 15 are, respectively, a front elevational view and top plan view of a modified embodiment of a sensor of the present invention.
Figure 15:
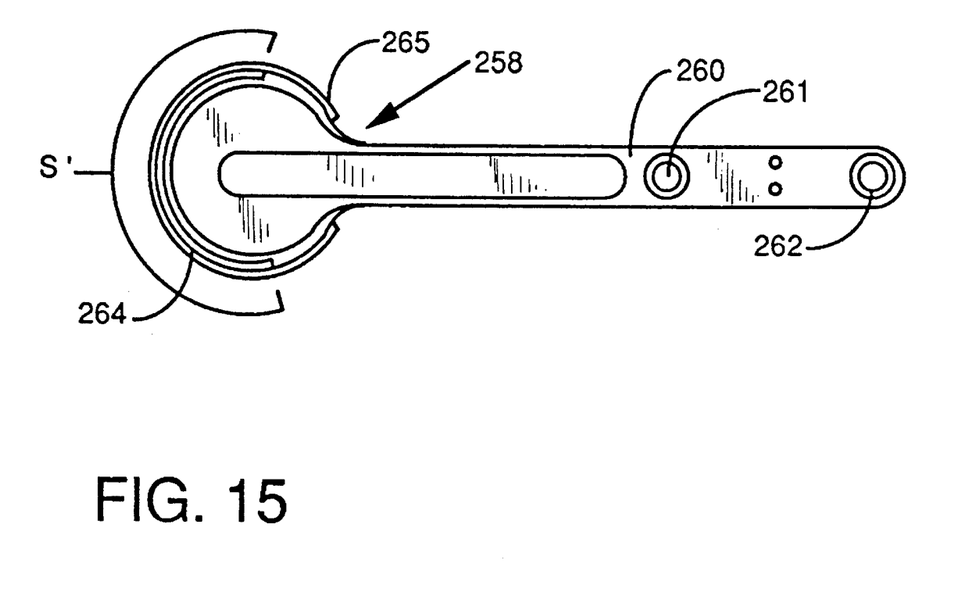

Referring to FIGS. 13 through 15, another embodiment of the invention which may be used in measuring wall thickness of non-round containers, which may be rectangular or oval, for example, will be considered. A container 250 is transported by the inspection station on conveyor 253 with suitable hold-down belt means (not shown) and guide rails (not shown) which resist axial rotation of the container being employed. Sensors 252, 254, 256 are positioned on one side of the path of travel of the container 250 on conveyor 253 and are vertically spaced from each other and have their free ends in general alignment. Sensors 258, 260, 262 are disposed on the opposite side of the container path of travel and are relatively vertically spaced with respect to each other in general alignment and are adapted to inspect the container from the other side. Changes in capacitance of the sensors 252–262 (even numbers only) will, respectively, be delivered to oscillators 272, 274, 276, 278, 280, 282 by means of cables 284, 286, 288, 290, 292, 294, respectively, with the signals being converted by the oscillators 272–282 (even numbers only) to corresponding voltages which are delivered to the multiplexer (not shown).

Referring to FIGS. 14 and 15, there is shown a sensor which has an elongated arm which may be mounted to the supports through openings 261, 262 and, at the other end, contains an elongated curved sensing element 264. A protective tape element 265 is positioned over part of sensor 264 to minimize sensor wear. The sensing area S' is shown. It will be noted that in the preferred embodiment, the arcuate extent of this sensing element exceeds 180 degrees and, preferably, is greater than 220 degrees. It is also noted that unlike the embodiment shown in FIG. 6, which has discrete sensing elements, the sensing element is preferably continuous.

Figure 16:
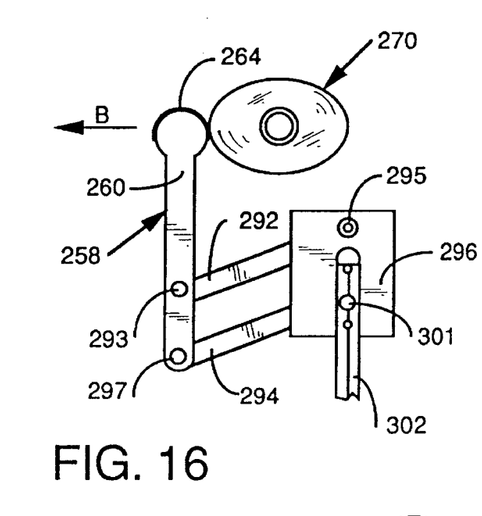
FIGS. 16 through 18 are, respectively, schematic views showing the sensor of FIGS. 14 and 15 in different positions with respect to an oval container which is being inspected.
Figure 17:
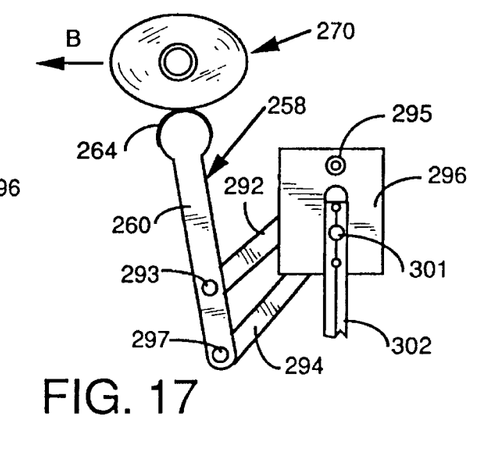

Referring to FIG. 16 and 17, the sensor 258 of FIGS. 14 and 15 is shown inspecting an oval container 270. It will be noted the container is moving in a direction indicated by the arrow B. In the position shown in FIG. 16, the right-hand portion of the sensor element 264 is inspecting a leading portion of the container 270. As the container continues to move, the sensor element slides along container surface and inspects the same. In FIG. 17, the sensor 258 has the sensing element 264 in contact with intermediate container surface. As the container continues to progress, the trailing portion of the container is inspected and the sensor assumes the position shown in FIG. 18. It will be appreciated that in effecting this inspection, the sensor element is moved through motion established by linkage arms 260, 292, 294 which are pivotally connected to sensor body 296.

Figure 16A:
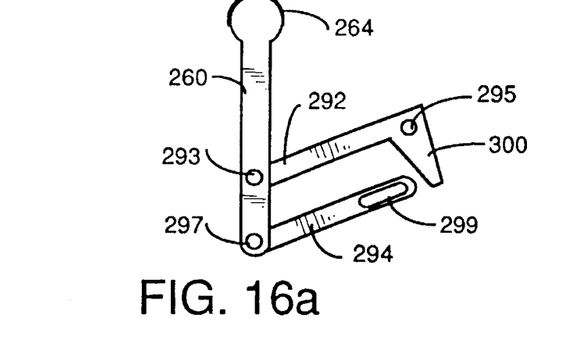

As shown in FIG. 16a, the linkage preferably includes link 260 which has sensor 264 disposed at one end. Link 260 is connected to link 292 at pivot 293 and to link 294 at pivot 297. Link 292 has right angled projection 300 and pivots about pivot 295 which may be a shoulder screw. Link 294 has elongated slot 299. A shoulder screw 301 which secures link 294 to the housing passes through slot 299 to limit travel of link 294. A mirror image sensor means to sensor means 258 will preferably be provided on the other side to inspect the other side surface of container 270, if desired. If such an arrangement is employed, it is preferred to stagger the two sensor means by offsetting one from the other by about 2 to 4 inches measured along the direction of container travel (arrow B).

Referring to FIG. 16, the oval container being inspected is moving in the direction of arrow B and has its major axis aligned with the direction of travel. In this position, the rear portion of continuous sensor 264 is in contact with the leading portion of container. It is preferred that torsion spring means disposed within the housing urge link 292 toward the position shown in FIG. 16. The torsion spring means (not shown) may be secured to the undersurface of housing 296, receive pivot pin 295 therethrough, and be secured to link 292.

As movement of container 270 continues, sensor 264 will continuously move along the container surface to have different portions of the sensor 264 progressively inspect different portions of the container 270. As the container 270 moves from the position of FIG. 16 to that of FIG. 17, sensor 264 pivots about pivot point 297 until the free end of link 294 moves to the right and contacts projection 300, after which, the container 270 will cause movement of the entire sensor supporting linkage about pivot 295 against the force of the torsion spring. This causes the sensor to assume the position of FIG. 17 and to progressively reach the position of FIG. 18. After the container 270 moves beyond the position of FIG. 18, the spring will return the sensor linkage to the position shown in FIG. 16.

It will be appreciated that if a similar sensor system were employed on the other side of the container, it would preferably be positioned at a relatively upstream or downstream position with respect to sensor 264. The other sensor would inspect portions of the circumference not inspected by sensor 264 at the same elevation as sensor 264.

While this embodiment of the invention has been shown inspecting an oval container, it will be appreciated that it may be employed for containers of a wide variety of different non-round shapes such as rectangular containers, for example.

Figure 18:
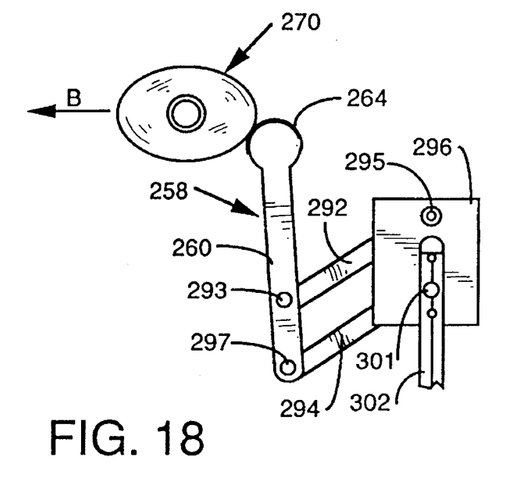

By employing a plurality of vertically spaced sensors corresponding to 258, the portions of the container 270 inspected in FIGS. 16 through 18, may be inspected at different elevations. Also, it is contemplated that a mirror image assembly of a sensor, such as 258, will be positioned on the opposite side of the path of travel of the container 270 to inspect the other surface walls (FIG. 18).

It will be appreciated that in the method of the present invention a non-round container is transported through the inspection region. Means are provided to resist axial rotation thereof. Sensor means are preferably positioned on both sides of the path of travel of the container. The sensor means may have a single sensor or plurality of relatively vertically spaced sensors. In a preferred embodiment, on each sensor, either some individual sensor elements or a portion of a single sensor element will be in a different plane from other sensor elements on the same sensor or from portions of the same sensor element. Changes in capacitance are monitored and converted by oscillator means to a corresponding output voltage which by means of electronic processor means is converted into a wall thickness value which is compared with the desired wall thickness to determine whether an unacceptable departure in wall thickness exists. If desired, means which are known to those skilled in the art may be provided for automatic rejection of such containers.

The method preferably employs sensors having one or more sensor elements with at least portions thereof not being disposed in the same plane as other portions or other elements thereof. Appropriate means are provided for moving the sensor means so as to correspond to the exterior configuration of the container.

In a preferred embodiment, the sensor has a plurality of individual sensor elements and in another preferred embodiment a continuous arcuate sensing element is provided.

The invention is suitable for measuring wall thickness on dielectric containers, such as glass or plastic containers which may be bottles or jars, for example, and may be employed to measure thickness at various elevations of the container.

It will be appreciated, therefore, that the present invention provides a means for rapidly inspecting wall thickness of non-round containers which are subjected to translational movement through the inspection station while resisting undesired axial rotation thereof. The sensor means are preferably movable to facilitate inspection of a number of container shapes. The movement of the containers through the inspection station is preferably continuous as there is no need to terminate motion during inspection. In a preferred embodiment, the sensor means are positioned on both sides of the path of travel of the container and have sensor elements so configurated as to efficiently measure wall thickness of the portion of the container being inspected at the elevation being inspected.

Whereas particular embodiments of the present invention have described above for purposes of illustration, it will be appreciated by those skilled in the art that numerous variations of the details may be made without departing from the invention as described in the appended claims.

We claim:

1. Apparatus for inspecting the wall thickness of a non-round container comprising capacitive sensor means for providing thickness information, oscillator means operatively associated with said sensor means for receiving said thickness information from said sensor means and generating corresponding voltage signals, electronic processor means for receiving said voltage signals and comparing them with desired thickness values in determining whether the desired thickness is present, means for translating said non-round containers sequentially into contact with said sensor means while rotation of said non-round containers while they are in contact with said sensor means, and said sensor means having at least one sensor with capacitive sensing portions not in the same plane as other capacitive sensing portions of said sensor.

2. The inspection apparatus of claim 1 including said sensor means having first sensor means for contacting a first portion of said container and second sensor means for contacting a second portion of said container, and said containers having a path of travel which extends between said first sensor means and said second sensor means.

3. Apparatus for inspecting the wall thickness of a non-round container comprising capacitive sensor means for providing thickness information, oscillator means operatively associated with said sensor means for receiving said thickness information from said sensor and generating corresponding voltage signals, electronic processor means for receiving said voltage signals and comparing them with desired thickness values in determining whether the desired thickness is present, means for translating said non-round containers sequentially into contact with said sensor means, said sensor means having at least one sensor with capacitive sensing portions not in the same plane as other capacitive sensing portions of said sensor, said sensor means having first sensor means for contacting a first portion of said container and second sensor means for contacting a second portion of said container, said containers having a path of travel which extends between said first sensor means and said second sensor means, said first sensor means having a plurality of said capacitive sensors spaced vertically with respect to each other, and said second sensor means having a plurality of second capacitive sensor spaced vertically with respect to each other.

4. The inspection apparatus of claim 3 including said means for translating said containers having means for moving said containers translationally while resisting axial rotation of said containers.

5. The inspection apparatus of claim 4 including said translating means including belt means for moving said containers in a linear path and rail means for resisting axial rotation of said containers.

6. The inspection apparatus of claim 3 including each said sensor having a plurality of sensor elements.

7. The inspection apparatus of claim 6 including each said sensor having a first surface and a second surface disposed at an angle thereto and abutting said first surface, and a first sensor element disposed on said first surface, a second sensor element disposed on said second surface and a third sensor element disposed in the region of abutment of said first and second surfaces.

8. The inspection apparatus of claim 7 including said sensors being movable with respect to said containers so as to permit said sensor elements on a said sensor to sequentially inspect different portions of said containers from the other said sensor elements.

9. The inspection apparatus of claim 8 including said first and second sensor elements being generally planar and said third sensor element being generally non-planar.

10. The inspection apparatus of claim 8 including said sensors being pivotally mounted, and means resiliently urging said sensors in a direction generally toward the path of travel of said containers.

11. The inspection apparatus of claim 3 including said apparatus being structured to inspect generally rectangular containers.

12. The inspection apparatus of claim 3 including said sensors having generally arcuate sensor elements.

13. The inspection apparatus of claim 12 including said arcuate sensor elements extending over a sector of greater than about 180 degrees.

14. The inspection apparatus of claim 13 including said arcuate sensor elements being substantially continuous.

15. The inspection apparatus of claim 12 including said apparatus being structured to inspect at least one container shape selected from the group consisting of rectangular and oval.

16. The inspection apparatus of claim 12 including each said sensor elements being mounted on a movable sensor arm, linkage means rotatably connected to said sensor arm for effecting movement thereof, and resilient means for moving said linkage means.

17. The inspection apparatus of claim 16 including said sensor element secured to one end of said sensor arm, and said linkage means having a first link rotatably secured to a first position of said sensor arm and a second link rotatably secured to a second position on said sensor arm.

18. The inspection apparatus of claim 17 including said first link and said second link having end portions rotatably secured within a housing.

19. The inspection apparatus of claim 17 including said first link having an extension disposed in the path of travel of said second link and being structured to serve as a stop therefor.

20. The inspection apparatus of claim 19 including said second link having an elongated slot and a cooperating element passing therethrough to limit travel of said second link.

21. The inspection apparatus of claim 3 including multiplexer means for receiving said voltage signals from said oscillator means and selectively delivering them to an analog-to-digital converter for conversion to digital pulses which are delivered to said electronic processor means.

22. The inspection apparatus of claim 3 including reject means for removing containers which do not pass inspection.

23. A method of inspecting the wall thickness of a non-round container comprising providing capacitive sensor means for emitting a signal corresponding to changes in capacitance, oscillator means for converting said signals to corresponding voltage signals and electronic processor means for comparing said voltage signals with a predetermined, desired container wall thickness, moving said non-round containers by said sensor means while maintaining contact between said containers and said sensors and resisting rotation of said containers, converting said capacitive changes due to variations in container wall thickness into corresponding voltage signals, comparing said thickness measurements in said electronic processor means with said desired thickness, and employing sensor means having at least one sensor with capacitive sensing portions not in the same plane as other capacitive sensing portions thereof.

24. The method of claim 23 including employing as said sensor means sensor means having first sensor means for contacting a first portion of said container and second sensor means for contacting a second portion of said container, and moving said containers translationally in a path passing between said first sensor means and said second sensor means.

25. A method of inspecting the wall thickness of a non-round container comprising providing capacitive sensor means for emitting a signal corresponding to changes in capacitance, oscillator means for converting said signals to corresponding voltage signals and electronic processor means for comparing said voltage signals with a predetermined, desired container wall thickness, moving said containers by said sensor means while maintaining contact between said containers and said sensors, converting said capacitive changes due to variations in container wall thickness into corresponding voltage signals, comparing said thickness measurements in said electronic processor means with said desired thickness, employing sensor means having at least one sensor with capacitive sensing portions not in the same plane as other capacitive sensing portions thereof, employing as said sensor means sensor means for contacting a first portion of said container and second sensor means for contacting a second portion of said container, and moving said containers translationally in a path passing between said first sensor means and said second sensor means, employing in said first sensor means a plurality of first capacitive sensors spaced vertically with respect to each other and employing in said second sensor means a plurality of second capacitive sensors spaced vertically with respect to each other.

26. The method of claim 25 including effecting sequential translational movement of said containers in said path while resisting axial rotation of said containers during thickness measurement thereof.

27. The method of claim 26 including employing belt means engaging the top of said container for moving said container in a linear path and rail means for resisting axial rotation of said containers.

28. The method of claim 26 including employing said process to inspect containers which are selected of the group consisting of glass containers and plastic containers.

29. A method of inspecting the wall thickness of a non-round container comprising providing capacitive sensor means for emitting a signal corresponding to changes in capacitance, oscillator means for converting said signals to corresponding voltage signals and electronic processor means for comparing said voltage signals with a predetermined, desired container wall thickness, moving said containers by said sensor means while maintaining contact between said containers and said sensors, converting said capacitive changes due to variations in container wall thickness into corresponding voltage signals, comparing said thickness measurements in said electronic processor means with said desired thickness, employing sensor means having at least one sensor with capacitive sensing portions not in the same plane as other capacitive sensing portions thereof, employing as said sensor means sensor means for contacting a first portion of said container and second sensor means for contacting a second portion of said container, moving said containers translationally in a path passing between said first sensor means and said second sensor means, and employing said sensors with each said sensing portion having a plurality of sensor elements.

30. The method of claim 29 including providing each said sensor with a first surface and a second surface disposed at an angle thereto and abutting said first surface, and employing said sensor elements on said first surface, on said second surface and in the region of abutment of said first and second surfaces.

31. The method of claim 30 including moving said sensors with respect to said containers so as to permit said sensor elements on said sensors to remain in intimate contact with said containers and to sequentially inspect different portions of said containers at the same container elevation.

32. The method of claim 31 including moving said sensors so as to effect sequential inspection of different portions of said containers at the same container elevation.

33. The method of claim 30 including providing said sensor elements on said first said surface and said second said surface as generally planar sensor elements and said sensor element at said surface abutment as a non-planar sensor element.

34. The method of claim 31 including continuously translationally moving said containers during said inspection.

35. The method of claim 29 including resiliently biasing said sensor generally toward the path of travel of said containers in order to establish intimate contact between said sensors and said containers during inspection.

36. The method of claim 35 including providing said sensors with generally arcuate sensor elements.

37. The method of claim 35 including providing said arcuate sensor elements with sensor portions extending over a sector of at least about 180 degrees.

38. The method of claim 37 including employing substantially continuous arcuate sensor elements.

39. The method of claim 37 including inspecting different portions of said container with different portions of each of said arcuate sensor elements.

40. The method of claim 37 including employing said method to inspect containers having a shape selected from the group consisting of rectangular and oval.

41. Apparatus for inspecting the wall thickness of a non-round container comprising capacitive sensor means for providing thickness information, oscillator means operatively associated with said sensor means for receiving said thickness information from said sensor means and generating corresponding voltage signals, electronic processor means for receiving said voltage signals and comparing them with desired thickness values in determining whether the desired thickness is present, means for translating said non-round containers sequentially into contact with said sensor means, and said means for translating said containers having means for moving said containers translationally while resisting axial rotation of said containers.

42. The apparatus of claim 41 including said sensors being movable with respect to said containers so as to permit said sensor elements on a said sensor to sequentially inspect different portions of said containers from the other said sensor elements.

43. The apparatus of claim 42 including said sensor means having first sensor means for contacting a first portion of said container and second sensor means for contacting a second portion of said container, and said containers having a path of travel which extends between said first sensor means and said second sensor means.

44. The apparatus of claim 42 including said means for translating including guide rails for engaging said containers and resisting axial rotation therefrom.

45. The apparatus of claim 41 including said sensor means having first sensor means for contacting a first portion of said container and second sensor means for contacting a second portion of said container, and said containers having a path of travel which extends between said first sensor means and said second sensor means.

* * * * *

UNITED STATES PATENT AND TRADEMARK OFFICE
CERTIFICATE OF CORRECTION

PATENT NO. : 5,558,233
DATED : September 24, 1996
INVENTOR(S) : Dimmick et al.

It is certified that error appears in the above-indentified patent and that said Letters Patent is hereby corrected as shown below:

Column 3, line 27, "shah" should be -- shall --.

Claim 1, column 8, line 47, -- resisting -- should be inserted after "while".

Claim 3, column 9, line 1, -- means -- should be inserted after "sensor".

Claim 3, column 9, line 18, the second occurrence of "said" should be deleted and replaced with -- first --.

Claim 35, column 12, line 35, "sensor" should be -- sensors --.

Signed and Sealed this

Twenty-first Day of October 1997

Attest:

BRUCE LEHMAN

*Attesting Officer*  *Commissioner of Patents and Trademarks*